US007441027B2

(12) United States Patent
Malik

(10) Patent No.: US 7,441,027 B2
(45) Date of Patent: *Oct. 21, 2008

(54) METHODS, SYSTEMS, AND PRODUCTS FOR CREATING MESSAGE LOGS

(75) Inventor: Dale W. Malik, Atlanta, GA (US)

(73) Assignee: AT&T Intellectual Property I, L.P., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/236,907

(22) Filed: Sep. 28, 2005

(65) Prior Publication Data

US 2006/0026232 A1 Feb. 2, 2006

Related U.S. Application Data

(63) Continuation of application No. 10/109,909, filed on Mar. 29, 2002, now Pat. No. 7,007,085, and a continuation-in-part of application No. 09/966,703, filed on Sep. 28, 2001, now Pat. No. 7,313,617.

(60) Provisional application No. 60/362,033, filed on Mar. 6, 2002.

(51) Int. Cl.
*G06F 15/173* (2006.01)

(52) U.S. Cl. .................................... 709/224

(58) Field of Classification Search .................. 709/224
See application file for complete search history.

(56) References Cited

U.S. PATENT DOCUMENTS 4,706,242 A * 11/1987 Harland ...................... 370/354
4,935,954 A * 6/1990 Thompson et al. ........ 379/88.04
4,969,136 A * 11/1990 Chamberlin et al. ...... 369/29.01
4,975,896 A * 12/1990 D'Agosto et al. ......... 369/29.01
5,311,583 A * 5/1994 Friedes et al. ........... 379/210.01
5,436,965 A * 7/1995 Grossman et al. ........ 379/266.08
5,570,417 A 10/1996 Byers
5,592,470 A 1/1997 Rudrapatna (Continued)

FOREIGN PATENT DOCUMENTS

JP 2000105739 A * 4/2000

(Continued)

OTHER PUBLICATIONS

"Microsoft Outlook 2000 SR-1 Readme File," www.microsoft.com/assistance/offhelp/off2000/outlook/outhlp9/html/olread9.htm, as of Apr. 30, 2002.

(Continued)

*Primary Examiner*—Jason Cardone
*Assistant Examiner*—Thomas Duong
(74) *Attorney, Agent, or Firm*—Scott P. Zimmerman, PLLC

(57) ABSTRACT

Methods, systems, and products are disclosed for creating a message log. The message log tracks non-recorded communications sent by and received by a user. One such system, for example, includes a processor communicating with memory. A communications manager is stored in the memory. The communications manager includes computer-readable instructions for storing an entry in the message log for each non-recorded communication sent by and received by a user. The message log may track any of wireline communications, voice mail communications, email communications, facsimile communications, pager communications, instant messages, electronic chat room communications, and unanswered telephone call attempts to contact the user.

12 Claims, 9 Drawing Sheets

U.S. PATENT DOCUMENTS

| | | | |
|---|---|---|---|
| 5,608,786 A * | 3/1997 | Gordon | 370/352 |
| 5,621,790 A * | 4/1997 | Grossman et al. | 379/266.08 |
| 5,644,624 A * | 7/1997 | Caldwell | 379/69 |
| 5,661,783 A * | 8/1997 | Assis | 379/88.01 |
| 5,708,775 A | 1/1998 | Nakamura | |
| 5,802,510 A | 9/1998 | Jones | |
| 5,812,654 A * | 9/1998 | Anderson et al. | 379/221.15 |
| 5,818,447 A | 10/1998 | Wolf | |
| 5,889,799 A * | 3/1999 | Grossman et al. | 379/266.08 |
| 5,909,589 A | 6/1999 | Parker | |
| 5,943,417 A * | 8/1999 | Cox et al. | 379/266.02 |
| 5,946,386 A * | 8/1999 | Rogers et al. | 379/265.09 |
| 5,966,437 A | 10/1999 | Cox et al. | |
| 5,978,475 A | 11/1999 | Schneier et al. | |
| 5,987,100 A | 11/1999 | Forman | |
| 6,014,135 A | 1/2000 | Fernandes | |
| 6,052,730 A | 4/2000 | Felciano | |
| 6,055,512 A | 4/2000 | Dean | |
| 6,065,047 A | 5/2000 | Carpentar | |
| 6,128,624 A | 10/2000 | Papeimiak | |
| 6,134,235 A | 10/2000 | Goldman | |
| 6,147,975 A | 11/2000 | Bowman-Amuah | |
| 6,148,329 A | 11/2000 | Meyer | |
| 6,151,584 A | 11/2000 | Papeimiak | |
| 6,154,530 A * | 11/2000 | Letellier | 379/142.06 |
| 6,167,119 A | 12/2000 | Bartholomew | |
| 6,182,142 B1 * | 1/2001 | Win et al. | 709/229 |
| 6,205,211 B1 | 3/2001 | Thomas | |
| 6,208,721 B1 * | 3/2001 | Feinberg et al. | 379/134 |
| 6,216,104 B1 | 4/2001 | Moshfeghi et al. | |
| 6,233,317 B1 | 5/2001 | Homan et al. | |
| 6,237,027 B1 * | 5/2001 | Namekawa | 709/206 |
| 6,247,043 B1 | 6/2001 | Bates et al. | |
| 6,266,690 B1 * | 7/2001 | Shankarappa et al. | 709/202 |
| 6,272,150 B1 | 8/2001 | Hrastar | |
| 6,272,537 B1 | 8/2001 | Kekic | |
| 6,282,275 B1 * | 8/2001 | Gurbani et al. | 379/142.06 |
| 6,301,245 B1 | 10/2001 | Luzeski et al. | |
| 6,308,328 B1 | 10/2001 | Bowcutt | |
| 6,317,485 B1 | 11/2001 | Homan et al. | |
| 6,320,947 B1 | 11/2001 | Joyce | |
| 6,330,079 B1 | 12/2001 | Dugan | |
| 6,338,066 B1 | 1/2002 | Martin | |
| 6,345,239 B1 | 2/2002 | Bowman-Amuah | |
| 6,351,771 B1 | 2/2002 | Craddock | |
| 6,353,852 B1 * | 3/2002 | Nestoriak et al. | 709/206 |
| 6,360,254 B1 | 3/2002 | Linden | |
| 6,404,762 B1 | 6/2002 | Luzeski et al. | |
| 6,411,685 B1 | 6/2002 | O'Neal | |
| 6,421,725 B1 * | 7/2002 | Vermilyea et al. | 709/224 |
| 6,424,966 B1 * | 7/2002 | Meyerzon et al. | 707/3 |
| 6,424,995 B1 | 7/2002 | Shuman | |
| 6,430,177 B1 | 8/2002 | Luzeski et al. | |
| 6,430,188 B1 | 8/2002 | Kadambi | |
| 6,434,747 B1 | 8/2002 | Khoo et al. | |
| 6,453,353 B1 * | 9/2002 | Win et al. | 709/229 |
| 6,493,437 B1 | 12/2002 | Olshansky | |
| 6,496,838 B1 * | 12/2002 | Zamora-McKelvy et al. | 707/201 |
| 6,515,968 B1 | 2/2003 | Combar | |
| 6,518,984 B1 | 2/2003 | Maeckel et al. | |
| 6,526,044 B1 | 2/2003 | Cookmeyer | |
| 6,529,954 B1 | 3/2003 | Cookmeyer | |
| 6,535,585 B1 * | 3/2003 | Hanson et al. | 379/88.12 |
| 6,556,666 B1 | 4/2003 | Beyda | |
| 6,564,261 B1 | 5/2003 | Gudjonsson et al. | |
| 6,570,885 B1 | 5/2003 | Gregg | |
| 6,594,255 B1 | 7/2003 | Neuman | |
| 6,615,241 B1 | 9/2003 | Miller et al. | |
| 6,631,186 B1 | 10/2003 | Adams et al. | |
| 6,633,630 B1 | 10/2003 | Owens | |
| 6,640,241 B1 * | 10/2003 | Ozzie et al. | 709/204 |
| 6,665,378 B1 | 12/2003 | Spielman | |
| 6,701,348 B2 | 3/2004 | Sommerer | |
| 6,708,202 B1 | 3/2004 | Shuman et al. | |
| 6,711,154 B1 | 3/2004 | O'Neal | |
| 6,717,513 B1 | 4/2004 | Sandelman | |
| 6,731,927 B1 | 5/2004 | Stern et al. | |
| 6,735,286 B1 | 5/2004 | Hansen | |
| 6,738,462 B1 * | 5/2004 | Brunson | 379/142.06 |
| 6,745,229 B1 | 6/2004 | Gobin et al. | |
| 6,747,970 B1 | 6/2004 | Lamb | |
| 6,748,056 B1 | 6/2004 | Capriotti | |
| 6,754,181 B1 | 6/2004 | Elliott | |
| 6,757,732 B1 * | 6/2004 | Sollee et al. | 709/227 |
| 6,760,601 B1 | 7/2004 | Suoknuuti | |
| 6,763,102 B1 | 7/2004 | Chen | |
| 6,766,369 B1 * | 7/2004 | Haitsuka et al. | 709/224 |
| 6,768,722 B1 | 7/2004 | Katseff et al. | |
| 6,772,188 B1 | 8/2004 | Cloutier | |
| 6,782,086 B2 | 8/2004 | Clapper | |
| 6,785,379 B1 * | 8/2004 | Rogers et al. | 379/265.02 |
| 6,788,926 B1 | 9/2004 | Frangione et al. | |
| 6,804,707 B1 | 10/2004 | Ronning | |
| 6,804,716 B1 | 10/2004 | Koch et al. | |
| 6,806,977 B1 | 10/2004 | Freeny | |
| 6,807,423 B1 | 10/2004 | Armstrong | |
| 6,816,469 B1 | 11/2004 | Kung et al. | |
| 6,820,204 B1 | 11/2004 | Desai | |
| 6,829,233 B1 | 12/2004 | Gilboy | |
| 6,857,024 B1 | 2/2005 | Chen | |
| 6,879,995 B1 | 4/2005 | Chinta et al. | |
| 6,882,709 B1 | 4/2005 | Sherlock | |
| 6,895,559 B2 * | 5/2005 | Forder | 715/780 |
| 6,910,186 B2 * | 6/2005 | Kim | 715/706 |
| 6,917,610 B1 | 7/2005 | Kung et al. | |
| 6,920,208 B1 * | 7/2005 | Rosen et al. | 379/126 |
| 6,928,154 B1 * | 8/2005 | Cheaito et al. | 379/207.15 |
| 6,940,958 B2 * | 9/2005 | Clapper | 379/142.01 |
| 6,947,979 B1 | 9/2005 | Pon | |
| 6,948,135 B1 * | 9/2005 | Ruthfield et al. | 715/854 |
| 6,973,556 B2 * | 12/2005 | Milligan et al. | 711/202 |
| 6,981,023 B1 | 12/2005 | Hamilton et al. | |
| 6,981,223 B2 | 12/2005 | Becker | |
| 6,988,128 B1 | 1/2006 | Alexander et al. | |
| 7,062,535 B1 | 6/2006 | Stark | |
| 7,088,805 B1 * | 8/2006 | Moore et al. | 379/121.05 |
| 7,096,232 B2 * | 8/2006 | Doss et al. | 707/104.1 |
| 7,107,275 B2 * | 9/2006 | Quinn et al. | 707/100 |
| 2001/0013050 A1 | 8/2001 | Shah | |
| 2001/0013069 A1 | 8/2001 | Shah | |
| 2001/0027478 A1 | 10/2001 | Meier | |
| 2001/0029468 A1 | 10/2001 | Yamaguchi | |
| 2002/0055924 A1 | 5/2002 | Liming | |
| 2002/0069048 A1 | 6/2002 | Sadhwani | |
| 2002/0073142 A1 | 6/2002 | Moran | |
| 2002/0078151 A1 | 6/2002 | Wickam et al. | |
| 2002/0091829 A1 | 7/2002 | Wood | |
| 2002/0099775 A1 | 7/2002 | Gupta et al. | |
| 2002/0099777 A1 | 7/2002 | Gupta et al. | |
| 2002/0111813 A1 * | 8/2002 | Capps | 705/1 |
| 2002/0174188 A1 | 11/2002 | Clark et al. | |
| 2002/0180776 A1 | 12/2002 | Fishman | |
| 2002/0194274 A1 | 12/2002 | Kroeger | |
| 2003/0009530 A1 | 1/2003 | Philonenko | |
| 2003/0087652 A1 | 5/2003 | Simon | |
| 2003/0156134 A1 * | 8/2003 | Kim | 345/753 |
| 2004/0091091 A1 | 5/2004 | Maruyama | |
| 2004/0236619 A1 * | 11/2004 | Gundersen et al. | 705/8 |
| 2005/0038863 A1 * | 2/2005 | Onyon et al. | 709/207 |

2005/0149487 A1* 7/2005 Celik .................... 707/1

FOREIGN PATENT DOCUMENTS

WO      WO 97/17774      5/1997

OTHER PUBLICATIONS

Microsoft Outlook version 2002 (included in Office XP), Microsoft Outlook Product Guide, pp. 1-12.

"Microsoft Office," Microsoft Outlook 2000 Product Enhancements Guide, Oct. 1998.

Microsoft Outlook 2000 "About" screen capture printout (1 page).

Microsoft Outlook Programming, webpage printout (5 pages) retrieved from www.outlookcode.com Apr. 17, 2006.

Gordon Padwick and Helen Ferddema, "Special Edition Using Microsoft® Outlook® 2000", May 12, 1999, Que.

* cited by examiner

MESSAGE LOG

| FROM | TYPE | SUBJECT | DATE |
|---|---|---|---|
| MAUDE DAVIS | E-MAIL | CHEF JEAN-LOUIS RESTAURANT | 5-21-99 |
| BILL JONES | VOICE MESSAGE | (703) 345-6789 | 5-20-99 |
| JOHN ELLIOT | FAX | CLOSING | 5-15-99 |
| DALE MALIK | TELEPHONE CALL | (404) 234-5678 | 5-14-99 |
| EMILY GUIDA | INSTANT MESSAGE | HOME SICK | 5-14-99 |
| USER | CHAT ROOM MESSAGE | ADOPTION | 5-13-99 |
| MARCUS DELGADO | PAGE | (770) 249-0972 | 5-12-99 |
| NANCY WOODARD | I-PAGE | STATUS REPORT | 5-5-99 |

FIGURE 2

| USER 102 PROFILE INFORMATION | |
|---|---|
| Preference | Type of Services |
| Subject Matter Group y. | Telephone |
| For Caller X | Cellular Phone |
| After 8 p.m. | E-mail |
| During 10-2; For Caller Group y. | Pager |
| Default Response | Fax |
| Call Group G | Voice Message |
| . . . | . . . |
| Correlated Information | All |
| Response to Web | Web |

202

List (204)

FIGURE 4

METHODS, SYSTEMS, AND PRODUCTS FOR CREATING MESSAGE LOGS

CROSS-REFERENCE TO RELATED APPLICATIONS

This application is a continuation of U.S. application Ser. No. 10/109,909, filed Mar. 29, 2002 now U.S. Pat. No. 7,007,085, entitled "Methods and Systems for One-Stop Communications Management" and incorporated herein by reference in its entirety. This application is also a continuation-in-part of the and commonly owned U.S. application Ser. No. 09/966,703, entitled "Methods and Systems for a Communications and Information Resource Manager" filed Sep. 28, 2001 now U.S. Pat. No. 7,313,617, and which is incorporated herein by this reference. This application also claims benefit of provisional application No. 60/362,033, filed Mar. 6, 2002 and entitled "Methods and Systems for Providing Information Correlated to a Communication," and which is incorporated herein by reference.

FIELD OF THE INVENTIONS

The inventions relate to communications, and particularly, to the management of information about a user's communications.

BACKGROUND

Recent technological advances have made communication devices ubiquitous. Each device may satisfy a respective different aspect of the communication needs of a user. For example, a person may have a number of communication devices at his or her disposal. The person may communicate using, among other things, a telephone, a wireless unit, a pager, a facsimile (fax) machine, or a personal digital assistant (PDA). The person also may use a computer or other device to provide information and to communicate using a web site, electronic mail (e-mail) messages, instant messages, or chat room messages. Accordingly, a person may send and receive a lot of communications using a variety of devices.

Typically, a person with a variety of communication devices has to individually monitor each of his or her devices, thereby expending significant time and effort. If the person cannot handle a communication in a "live" fashion on any particular device, a message, note, or other record may be made of the attempted communication. Thus, the monitoring of the communication devices also may require monitoring of the devices for messages for the user. Generally, a person uses his or her communication devices in an ad hoc manner, and so, the monitoring of messages across the variety of devices also may be done in an ad hoc manner. Thus, there is a need for a better way to keep track of all of the communications of a person.

As noted, an attempt at communication with a person may be recorded or otherwise noted in a message that may be later accessed by the person. For example, a caller may leave the person a message on his or her voicemail system. Also, a communication such as an e-mail message or a fax may leave its own record of communication. But certain types of communications and communication devices typically do not leave their own records or allow for a message to be left for the person. Thus, these "non-recorded" communications are difficult to find out about, to track, or to review. For example, a person makes a telephone call to a friend, but the friend does not answer and does not have any answering system. The person generally does not have a way to keep track of the call attempts the person has made. As another example, assume the person has enabled an instant messaging service while working on his or her computer. Typically, there is no record made of an instant message that is sent or received. As yet another example, assume the person engages in a chat room discussion by using his or her computer. Generally, the person's participation in the chat room discussion is not noted or otherwise recorded. The communications and communication devices that do not leave their own records or allow for a record, note, or message are referred to herein as "non-record" communications or "non-record" communication devices.

The inability to keep track of certain types of communications can prove a disadvantage—especially in business circumstances. For example, a person may be negotiating a deal involving multiple parties. Each party participates in the negotiations by using his or her own preferred communication means and devices. The person may have a log of e-mails, an answering machine full of voice mail messages, and a stack of faxes relating to the negotiations. But one of the parties may be participating in the negotiations by using some type of communications device or mechanism that does not allow for records or logs of that type of communications. So, the person's attempts at communication with the "non-record" party may not be noted by the non-record party. The non-record party may be suspicious that such attempts at communication were ever made. But the person has no way to prove he or she made the attempts. The person is at a disadvantage because he or she cannot keep track of, access, or review the attempts at communicating with the "non-record" party. The inability to be able to keep track of, access, or review these "non-record" communications can lead to miscommunication, misunderstanding, missed opportunities, and even frustration. Thus, there is a need for a way to keep track of the communications of a person including non-record communications and communications made to and/or from the non-record communication devices.

Some disadvantages of the non-record communications and non-record communication devices have been noted. But even communications that leave a record (such as an e-mail) have disadvantages. For example, an e-mail message may refer to a specific topic, and it would be to the person's advantage to review other data related to the specific topic. Moreover, it would be advantageous to carry out such a review as quickly and efficiently as possible. For example, a message may refer to a work document, an electronic publication, or a web page which may be shared between the person and his or her communication partners. Using conventional methods, the person must individually identify, search and retrieve the work document. The activities carried out to obtain the work document may be time consuming, inefficient, and otherwise frustrating. Thus, there is a need to provide a person with information related to a message in an efficient and quick manner.

As noted, a person generally has a lot of different types of communication devices. The person may prefer to receive certain types of communications through a certain type of device or at a certain time. The person may prefer not to receive communications of a certain type or during a certain time. Thus, there is a need for a way to manage the communications of a person so that his or her preferences are respected and are automatically implemented.

Similarly, family members, friends, business colleagues and other communicating partners of a person may have their respective communication preferences. The person could try to memorize all of the preferences. But that may be a lot of information to keep track of, and it may be easy to make errors. For example, a client may prefer to receive communications via his or her voicemail box. If the person sends an e-mail message to the client, there may arise a delay in communication. In addition, by sending the e-mail rather than leaving a voicemail message, the person may convey the impression that the person is insensitive to the client's preferences. Neither result is desirable. Thus, there is a need for a way to manage the communications of a person so that communications made to communicating partners are made automatically in accordance with the preferences of the respective communicating partner.

In sum, there is a need for a unified messaging system that keeps track of all of a person's communications without the person having to monitor each of his or her communication devices including non-record communications and communications made to and/or from the non-record communication devices. There is also a need for a way to manage the communications of a person so that his or her preferences are respected and are automatically implemented. In addition, there is a need for a way to manage the communications of a person so that communications made to communicating partners are generally made automatically in accordance with the preferences of the respective communicating partner.

SUMMARY

The inventions described herein provide information about a user's communications. The inventions allow a user to obtain information correlated or corresponding to a communication. In addition, the inventions allow a user to take action based on the information about a communication or the correlated or corresponding information.

An embodiment of the inventions includes a system for making information correlated to a communication automatically available to a user. The system includes a telecommunications (telecom) manager connected to a telecommunications network; a gateway connected to a data network; and a communications manager that may communicate with the telecom manager and the gateway. In addition, the communications manager may store information about a user's communication preferences. The preferences may include a preference for presentation of information correlated or corresponding to a communication.

In the exemplary embodiment, the communications manager receives information about a communication relating to a user from the telecom manager or from the gateway. The communication may include an instant message, a chat room message, or an attempt to reach the user by a caller using a wireline or wireless device. The communications manager uses the information to create an entry corresponding to the communication and to include the entry in a log. The log is displayed, and the user may select an entry from the log. In response to an indication of the selection of an entry, the communications manager may check the user's preferences. The preferences may include a preference for the presentation of the information correlated to a communication. In response to finding the preference, the communications manager obtains and presents the correlated information. The communications manager may obtain the information correlated to the communication from its own resources, from the telecom manager, or from the gateway.

As noted, the communications manager may include a user's preferences. The preferences may include a request for display of information corresponding to a communication when the communication is initiated by the user. The initiated communication may include an instant message, a chat room message, or an attempt to reach the user by a caller using a wireline or wireless device. The communications manager may act according to the user's preference by noting the initiation of a communication by the user. The communications manager then may check the user's preferences for inclusion of the request for the display of information corresponding to the initiated communication. If the communications manager finds the request, then the communications manager may use communication information regarding the initiated communication to obtain and present the corresponding information. In addition, the communications manager may make the communication information regarding the initiated communication available in a log.

Another embodiment of the inventions includes a method for making information correlated to a communication automatically available to a user. The communication may be an instant message, a chat room message, or an attempt at completing a wireline or wireless call to the user. The method stores a user's preference for presentation of information correlated to a communication. In response to receiving information about a communication, the method uses the information to create an entry corresponding to the communication, includes the entry in a message log, and displays the log. The method may receive an indication of selection of an entry from the message log. In response to the indication, the method may check the preferences for the preference for the presentation of the information correlated to the communication. In response to finding the preference, the method obtains and presents the correlated information.

Among the user's preferences may be included a request for display of information corresponding to a communication initiated by the user. An initiated communication may include an instant message, a chat room message, or an attempt at completing a wireline or wireless call to the user. The method may act according to the preference when the method notes the initiation of the communication by the user. The method checks the user's preferences for the request for the display of the information corresponding to the initiated communication. Based on finding the request, the method may use the communication information regarding the initiated communication to obtain and present the corresponding information. In addition, the method may make the communication information regarding the initiated communication available in a message log.

Yet another embodiment of the inventions includes a method for keeping track of communications of a user. In this embodiment, the method may receive information regarding communications of the user from a gateway connected to a data network. The communications may include an instant message or chat room message to or from the user. The method stores the information in a message log by including an entry for each communication of the user, and particularly by including an entry for each instant message or chat room message of the user.

The exemplary method also may receive information from a telecommunications manager connected to a telecommunications network regarding an attempt to reach the user via wireline or wireless call. The method stores the information regarding the attempt in an entry in the message log. Further, the method may receive information regarding an attempt by the user to make a wireline or wireless call. The method stores information regarding the attempt in an entry in the message log.

BRIEF DESCRIPTION OF THE DRAWINGS

FIG. 2 is an exemplary message log as may be used with the present inventions.

FIG. 4 is a table illustrating a user's profile information as may be used with the present inventions.

DETAILED DESCRIPTION

Figure 1:
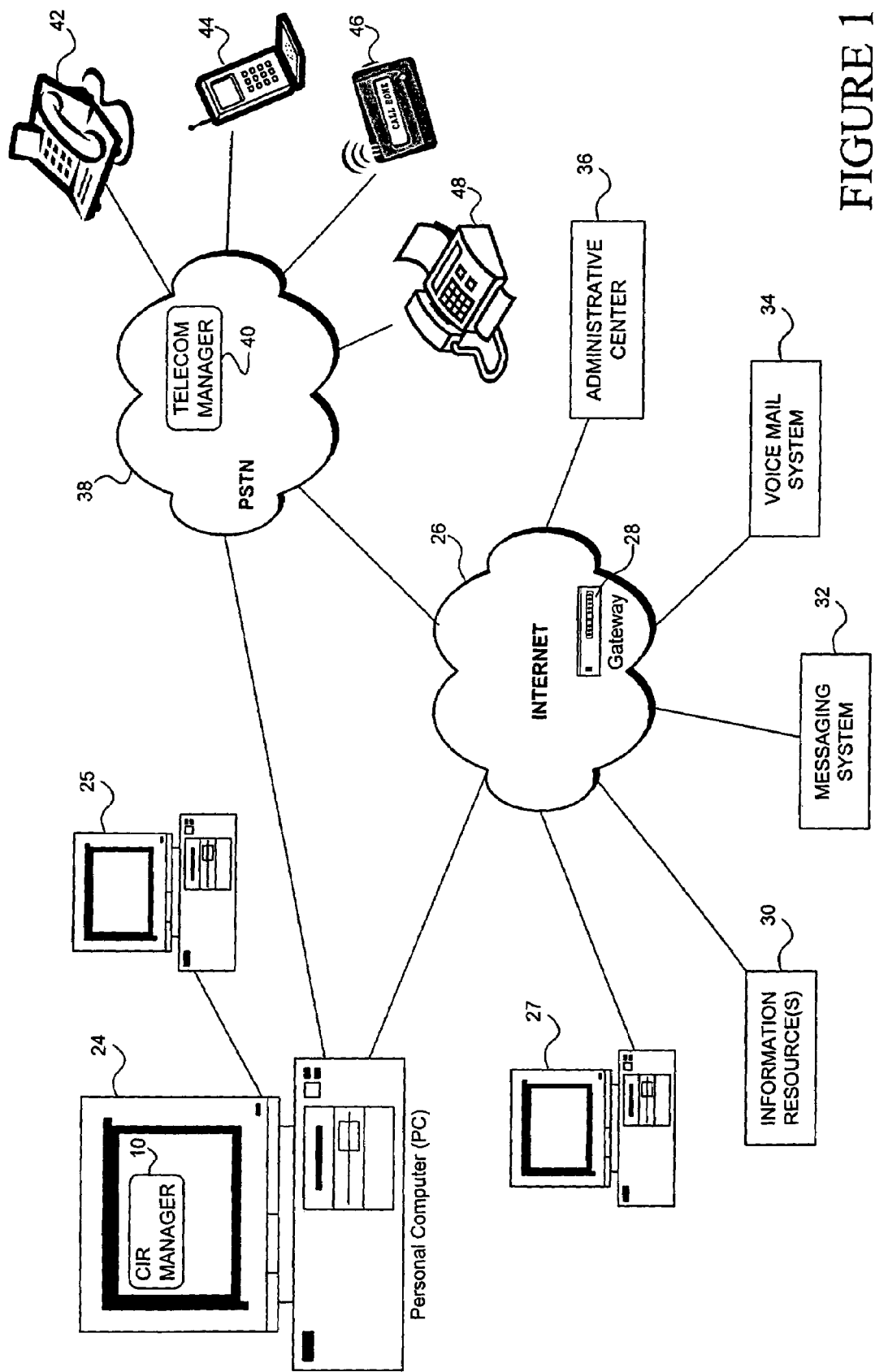
FIG. 1 is a block diagram of an exemplary environment for operation of the inventions described herein.

Stated generally, the inventions provide information about a user's communications, provide a user with information correlated or corresponding to a communication, and/or allow a user to take action based on the information about a communication or the correlated or corresponding information.

In a related patent application, a communications and information resource (CIR) manager is described. See U.S. patent application Ser. No. 09/966,703, entitled "Methods and Systems for a Communications and Information Resource Manager," filed Sep. 28, 2001, which is incorporated herein by this reference. The CIR manager may be used to implement the inventions described in this application. Prior to describing the present inventions, some background about the CIR manager is provided.

The CIR Manager

A CIR manager may function as a "super" manager with respect to the communications devices, services, and systems of a user. In particular, the CIR manager may be used to centralize communications activities and information such that the user does not have to (but may) use multiple communications devices. For example, the CIR manager may be used to keep a log of all types of communications related to the user—whatever the device, whatever the service, whatever the network.

An advantage of the CIR manager is the user does not have to check or use each type of device for its own type of messages. Another advantage is the CIR manager may obtain information from resources including third party resources so as to facilitate communications and information gathering activities of the user. With the CIR manager, the user is provided with a centralized, efficient, and user-friendly way to handle communications activities including ways to receive, view, listen to, play, respond to, store, log, monitor, delete, copy, forward, obtain, create, and to take other actions. Moreover, the CIR manager provides the user with personalized management of communications and information resources.

In addition, in managing the communications and information resources of the user, the CIR manager may provide the user with one or more of the following features and advantages:

Recognition of the user and of others as authorized by the user;

Remembrance and implementation of authorized users' preferences;

Aid in finding information and resources;

Information related to authorized users' activities and communications including call management and detail;

Service set-ups, configurations, changes, deletions, additions, updates, and synchronizations;

Maintenance of user account and preference information, logs, activity logs, schedules, calendars, general directories, personal directories, and the like;

Unified messaging including notice to the user relating to communications and/or other actions; and Suggestions, help, updates, reminders, warnings, alerts, and other comments.

The CIR manager may integrate the features described above pursuant to a user's preferences so as to provide efficient, organized, and user-friendly communications and information resource management.

Even though the inventions are described herein by reference to a CIR manager installed in a personal computer (PC), the inventions may be practiced with another manager, and/or other computer system configurations, including hand-held devices, multiprocessor systems, microprocessor based or programmable consumer electronics, mini-computers, mainframe computers, etc.

Exemplary Operating Environment of a CIR Manager—FIG. 1

Exemplary functions of a CIR manager 10 are described above. To provide these functions and others, the CIR manager 10 may interact with a variety of systems, networks, and elements that may be directly connected to the CIR manager 10, may be hosted by the same host(s) as the CIR manager 10, may be functionally connected to the CIR manager 10, and/or may be accessible to the CIR manager 10 either directly and/or through other systems, networks, and/or elements.

FIG. 1 illustrates an exemplary operating environment of a CIR manager 10 implemented on a personal computer (PC) 24. For details of an exemplary PC 24 as may be used with the CIR manager 10, see the previously referenced related application U.S. patent application Ser. No. 09/966,703, entitled "Methods and Systems for a Communications and Information Resource Manager," filed Sep. 28, 2001.

The operating environment of FIG. 1 illustrates the CIR manager 10 may communicate through the PC 24 with another computer(s) 25 connected or otherwise networked with the PC 24. The CIR manager 10 also may communicate through the Internet 26 with the following:

Other computer(s) 27;

A gateway 28 serving the CIR manager 10;

An information resource 30 such as a database;

A messaging system 32;

A voicemail system 34;

An administrative center 36; and

The public switched telephone network (PSTN) 38.

In addition, the CIR manager 10 may communicate through the PSTN 38 with the following:

A telecommunications manager 40;

A telephone (wireline unit) 42;

A wireless unit 44;

A pager 46; and

A fax device (not illustrated).

The CIR manager 10 may have access to other computers 25 through local area networks (LANs), wide area networks (WANs), direct connections and other dial-up networks.

The CIR manager 10 also may have access through the PC 24 to a global communications network such as the Internet 26, and through the Internet 26 to other units, networks, and systems. Particularly, the CIR manager 10 may communicate with a gateway 28 connected to or operating on the Internet. The gateway 28 may be a service platform, or other device. The gateway 28 may be provided by the service provider of the CIR manager 10, and may serve the CIR manager 10. Communications activities to and from the CIR manager 10 on the PC 24 may be directed to the gateway 28 and/or may pass through the gateway 28 to other systems, networks, and/or elements. In passing through the gateway 28, the communications activities may be facilitated by the gateway 28.

For example, assume a user is a new subscriber to the CIR manager 10. In setting up the user for services available through the CIR manager 10, the CIR manager 10 may send a communication to the gateway 28 for routing to the appropriate element to handle such set-up activities. In an exemplary embodiment, Administrative Center 36 may handle administrative matters including set-up activities for the service provider. The gateway 28 delivers or otherwise routes the communication to the Administrative Center 36 for the set-up activity. The Administrative Center 36 may respond to the gateway 28 with questions, information, and instructions for the CIR manager 10.

Another way in which the gateway 28 may facilitate communications activities of the CIR manager 10 is to function as a router or director of communications and messages. For example, the CIR manager 10 may forward a request for data to the gateway 28. The gateway 28 may determine the data may be obtained from the information resource 30. The gateway 28 then forwards the request for data or the appropriate message to the information resource 30. The information resource 30 may respond to the CIR manager 10 or to the gateway 28, which then communicates with the CIR manager 10.

Further, the gateway 28 may facilitate communications activities between the CIR manager 10 and the PSTN 38, and other elements reached through the PSTN 38 such as the telecom manager 40, and the communications devices including the wireline unit 42, the wireless unit 44, the pager 46, and the fax device 48. Generally, the telecom manager 40 provides general functions and features related to communications of a user. Specifically, the telecom manager 40 may be implemented in a computer, on a service platform, in a network node, or other device. The telecom manager 40 may include connections to devices and networks through integrated services digital network (ISDN) lines and signaling system 7 (SS7) data links. The telecom manager 40 may be capable of functions similar to those of a service switching point (SSP) or service node (SN) of an Advanced Intelligent Network (AIN). For example, the telecom manager 40 may have the following capabilities: signaling, call set-up, routing, and access to databases.

Message Logs Function and a Message Log—FIG. 2

The CIR manager 10 includes a Message Logs function, which as its name implies, enables the CIR manager to keep one or more message logs of the user's communications. A message log also may be referred to as a log. In particular, the exemplary Message Logs function of the CIR manager 10 relates to the organization, preferences, summary, and display of information pertaining to communications activities of a user. For example, the Message Logs function may enable one or more summaries of new, reviewed, sent, or other communications. Also, the Message Logs function may enable one or more call activity logs that keep track of calls or communications activities by the user.

Advantageously, the Message Logs function allows the user to keep track of all types of communications activity including conventional messages such as voice mails, e-mails, faxes, and pages. Plus, the Message Logs function allows the user to keep track of other types of messages such as instant messages, conversations in a chat room, and attempts at contact made by others.

FIG. 2 illustrates an exemplary message log 50 such as may be provided by the CIR manager 10 and used in connection with the inventions described herein. Message log 50 includes entries relating to the exemplary user's communications using the CIR manager 10. In the example, message log 50 includes eight entries 52, 54, 56, 58, 60, 62, 64, and 66. Each entry includes data 68, and in this example, each entry includes four types of data: "from" 70; "type" 72; "subject" 74; and "date" 76. The from data 70 refers to the source or origin of the communication. The type data 72 refers to the type or kind of communication. The subject data 74 refers to the content, the substance, or other feature of the communication. The date data 76 refers to the date of receipt (or transmittal if from the user) of the communication.

Advantageously, the user may obtain available additional information about the communications entered in the message log 50 through use of the inventions described herein. For example, assume the user desires more information about the communication relating to entry 54. Entry 54 relates to a voice message (such as a voicemail message) from Bill Jones received on May 20, 1999 from telephone number: (703) 345-6789. As is explained in greater detail below, through use of the inventions, the user may obtain additional information about the voicemail message from Bill Jones.

Figure 3:
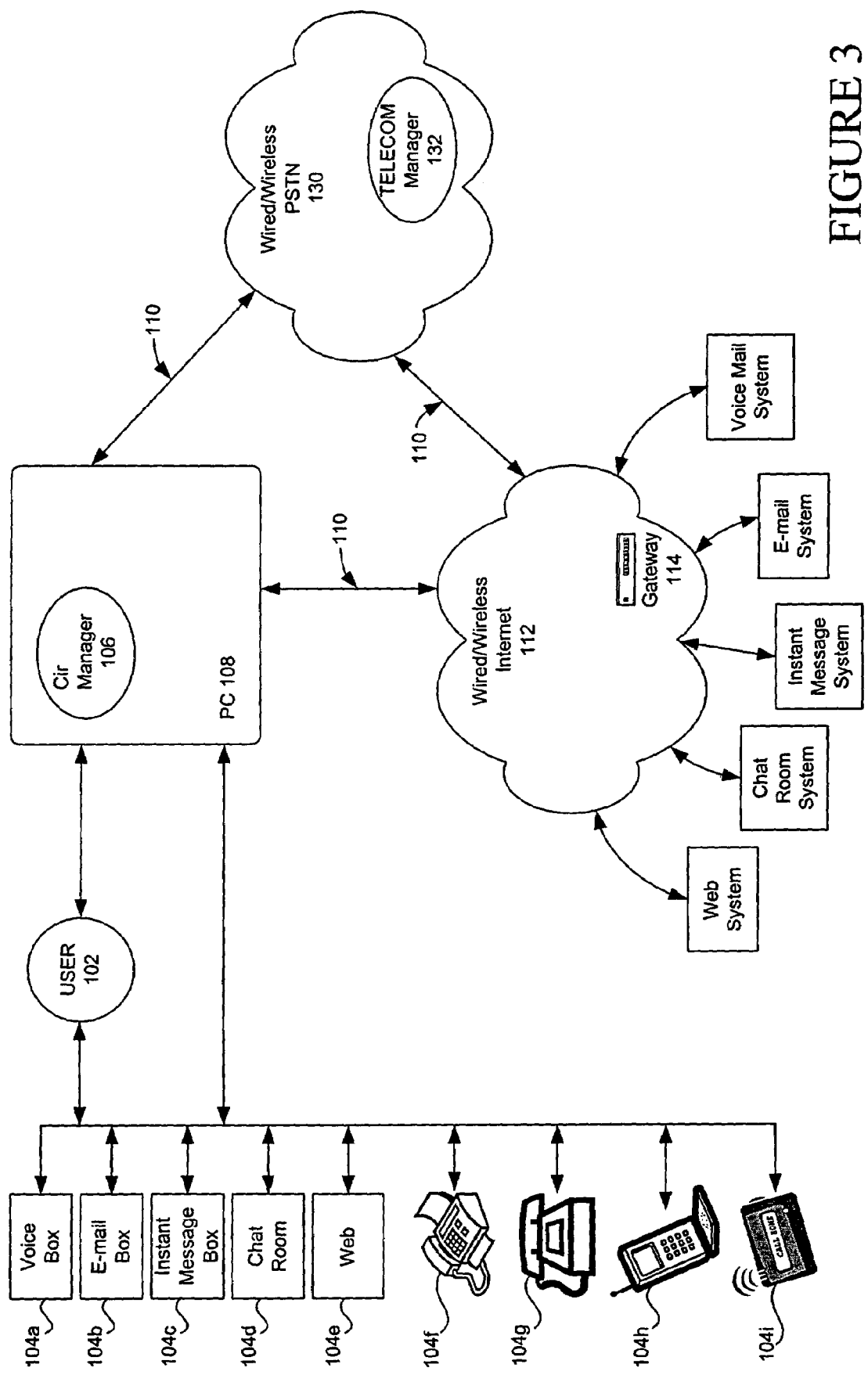
FIG. 3 is a block diagram of exemplary of another exemplary operating environment for the inventions described herein.

Another Exemplary Operating Environment of a CIR Manager—FIG. 3

FIG. 3 illustrates another exemplary operating environment for the present inventions. In this environment, a user 102 has a plurality of communication devices and media available for communications, commonly designated as 104. The communication devices and media may include: a voicemail system as designated by the user's voice box 104a; an e-mail system as designated by the user's e-mail box 104b; an instant messaging system as designated by the user's instant message box 104c; a system for participating in a chat room as designated by the user's chat room box 104d; a web site or web page as designated by web 104e; a fax system as designated by fax 104f; a telephone (wireline device) 104g; (h) a wireless unit 104h; and a pager 104i. In sum, the user 102 has a diverse means of communicating with his or her communication partners.

As noted above, the present inventions may be implemented through the use of a CIR manager 106. Typically, the CIR manager 106 is hosted on computer or in a computing environment, such as a personal computer (PC) 108. However, the CIR manager can be hosted on any computer device, wired and wireless. Further, in a preferred embodiment, the connection 110 between the PC 108 hosting the CIR manager 106 and the Internet 112 is a persistent connection, preferably using broadband technology. More particularly, the connection 110 provides means to communicate with a gateway server ("gateway") 114. As those skilled in the art will appreciate, any wired or wireless connection can be used for the connection 110.

Briefly, the CIR manager 106 provides a unified, one-stop view of the user's communications. For example, when Client A of the user 102 leaves a voicemail message for the user, the CIR manager 106 learns of the event, creates an entry for the event in a message log, and provides information regarding the voicemail message to the user 102. If the user has expressed a preference to be provided with additional information, the CIR manager 106 may provide additional information regarding the voicemail message to the user.

As another example, when the user 102 engages in a chat room discussion, the CIR manager 106 learns of the event, creates an entry for the event in a message log, and provides information related to the chat room discussion. If the user has expressed a preference for additional information, the CIR manager 106 may provide additional information regarding the chat room message. Advantageously, the user may add information or otherwise characterize the entry for the chat room discussion. For example, assume a user finishes a chat room discussion. The CIR manager 106 creates an entry for the discussion. In the course of creation of the entry, the CIR manager 106 may query the user for input to be included in the entry regarding the chat room discussion. By this feature, the CIR manager 106 allows for the creation of entries that are useful to the user.

As yet another example, when the user 102 engages (receives or sends) in an instant communication, the CIR manager 106 learns of the event, may provide information about the event, and creates an entry for the event in a message log. If the user has expressed a preference for additional information, the CIR manager 106 may provide additional information regarding the instant information to the user. As with the chat room discussion, the CIR manager 106 may give the user an opportunity to provide input such as "subject" or other information to be included in the entry for the instant message. Assume the user has included "adoption" in the subject field in the data of an entry relating to an instant message. The CIR manager 106 may categorize the entry for the instant message as related to other entries and messages including "adoption" in the subject field. Based on this categorization, the user 102 can retrieve the information relating to the instant communication having adoption in the subject field as well as relating to other communications having adoption in the subject field.

The CIR manager 106 can provide a unified, one-stop view of the user's communications because the CIR manager 106 may be set up to communicate with the application program interface ("API") for each of the providers and/or programs that enable corresponding communication devices and activities. The ability of the CIR manager 106 to communicate with APIs and applications allows the CIR manager 106 to carry out a user's preferences with respect to the presentation of information relating to the user's communications. The CIR manager 106 may communicate with the plurality of the API's using any of conventional methods such as polling, event driven interrupts, and/or a token ring.

The CIR manager 106 as hosted by PC 108 may communicate with a telecommunications manager 132 in the PSTN 130 by a wired or wireless connection. When communications are received or sent via the PSTN 130, the CIR manager 106 learns of the communication events, generally creates entries corresponding to the events, and can categorize the communications, so that the user 102 can have a complete view of his or her communication activities. Moreover, the CIR manager 106 may tag the data or part(s) of the data in an entry. The CIR manager 106 may use the tag to retrieve the data or part(s) of the data in an entry, or for other reasons. The tag may be a numerical tag or other tag or indicator. The CIR manager 106 may tag the data or part(s) of the data based on preferences of the user indicated at time of system set-up or at other times.

For example, when a call is directed to the telephone number corresponding to the user's telephone 104g, a telecom manager 132 in the PSTN 130 notifies the CIR manager 106 of the call. The CIR manager 106 creates an entry for the telephone call in the message log even if the call goes unanswered. The CIR manager 106 may tag data (including part(s) of the data) in the entry the CIR manager 106 creates for the unanswered call. The CIR manager 106 may tag the data for several reasons. For example, the CIR manager 106 may tag the originating telephone number in the entry for the unanswered call so as to be able to obtain additional information about the unanswered call. Then, if the user seeks additional information about the unanswered call, the CIR manager 106 may use the tagged data (the originating telephone number) to obtain the additional information. Using the tagged data, the CIR manager 106 may check its own resources to determine whether it has additional information on the originating telephone number. Using the tagged data, the CIR manager 106 may contact the telecom manager 132 for additional information such as a reverse white pages listing corresponding to the originating telephone number.

In addition or in alternative to using the tagged data to obtain additional information about a communication, the CIR manager 106 may use the tagged data to retrieve the substance of the communication. The tagged data may provide information to the CIR manager 106 with respect to the path or route to take to retrieve the substance of the communication. In some cases, the tagged data may provide the CIR manager 106 with information on the application(s) to call to retrieve the substance of the communication. The tagged data is not necessarily data included in the entry corresponding to the communication in the message log. For example, the CIR manager 106 may receive information from the gateway 114 on a voicemail message for the user. The CIR manager 106 may tag data so as to obtain information on the retrieval through the gateway 114 of the substance of the voicemail message from a voicemail system.

With the entries in the message log, the user has a record of attempts made to contact him or her via a call to the user's telephone number. The entry for the unanswered call may be marked as an "unanswered call". In creating the entry regarding an attempted call (wireline or wireless), the CIR manager 106 may not be able to fill in all of the fields of the data in the entry. For example, the CIR manager 106 may be unable to fill in the subject field for an unanswered call. But the CIR manager 106 may substitute some other information (like "unanswered call") in the subject field of the entry. Advantageously, the user may add any missing information or substitute other information in the entry.

As another example, when a fax document is transmitted to the user, the telecom manager 132 notifies the CIR manager 106. The CIR manager 106 creates an entry for the fax in the message log. The CIR manager 106 may tag data or part(s) of data in the entry the CIR manager 106 creates for the fax. The tagged data may be used by the CIR manager 106 to obtain additional information correlated or corresponding to the fax, or for other reasons. The user may be able to access the fax by activating the entry for the fax in the message log. In response to the activation of the entry for the fax, the CIR manager 106 may query the user for input on desired actions. The user may indicate a desire to review the fax. In response to the indication, the CIR manager 106 may use tagged data in the entry corresponding to the fax or other tagged data related to the fax to obtain the substance of the fax. The CIR manager 106 then may display the fax to the user on the computer screen or otherwise take actions to present the fax to the user.

Referring again to FIG. 3, the telecom manager 132 in the PSTN 130 may communicate with the gateway 114 in the Internet 112. The techniques and methods of communications between elements in the PSTN 130 and the Internet 112 are well known to those skilled in the art.

Profile Information—FIG. 4

Referring to FIG. 4, the CIR manager 106 includes profile information 202 for the user 102. For example, profile information 202 for the user 102 includes, among other things, a list of the communication devices, such as a telephone, a cellular telephone, or a pager of the user 102. The profile information file 202 also includes information regarding the user 102's preferred methods of communication. The exemplary profile information 202 shows the preferences may include: (a) the time of the communication; (b) the identity of the communication partner(s); and (c) the subject matter of the communication. Of course, other preferences may be included or substituted.

The profile information 202 also illustrates the user may set his or her preferences regarding the presentation of information in addition to, correlated to, or corresponding to a communication. Such additional, correlated, or corresponding information may include, inter alia, information to related communications, identifying information regarding communication originators or recipients, and information on subject matter mentioned in the communication or in information about the communication. Additional, correlated, or corresponding information also may include other entries, or communications sharing some feature in common with the entry (or related communication) for which the correlated information is sought. Further, additional, correlated, or corresponding information may relate to documents and the like that may be referenced in a communication, or in an entry relating to a communication in a message log.

For example, an entry for an instant message may include through user input reference to a document such as "work report" in the subject field of the entry in the message log. The data relating to the "work report" in the subject field of the entry may be tagged so the CIR manager 106 may use the tagged data to obtain the document, or to obtain instructions on how to obtain the document. Advantageously, the user simply may activate the subject field of "work report" and obtain correlated information including access to or a copy of the referenced work report.

The additional, correlated or corresponding information need not directly pertain to the entry used in finding the information. There may be an indirect or two or more step relationship between the entry and the additional, correlated, or corresponding information. For example, the subject feature or subject data of an entry 80a may include the telephone number: (704) 345-6789. By its inclusion of the "704" area code, the number implies the associated telephone is located in the State of North Carolina. Thus, an internet link to the Tourism Board of North Carolina may constitute correlated information to the entry including the telephone number (704) 345-6789.

In the exemplary profile information 202 of FIG. 4, the preference for correlated information is set to "all". In this example, the "all" setting indicates the user's preference for correlated information on all communications to/from whatever devices. For example, assume the user receives an e-mail, a page, and a fax. Information on each communication is entered into the message log. As part of creating each entry for the message log, the CIR manager 106 may tag data or part(s) of data in each entry so that correlated information may be retrieved respectively for each entry. The preference for correlated information may be set to include less than all devices.

In addition, through the profile information 202 or otherwise, a user may indicate preference for correlated information based on a factor other than the type of device originating a communication to or from the user. For example, the user may choose one or more fields of an entry in the message log as holding the data to be tagged for obtaining correlated information or otherwise. To further this example, the user may indicate a preference for obtaining correlated information on each originator or source of a communication (the "from" field in an entry). Advantageously, the user may mix and match the various factors of a communication so as to indicate the user's preferences for correlated information. For example, the user may indicate a preference for correlated information on all communications to/from a pager and on the data in the subject fields of all communications.

Also, the profile information 202 relating to a user can be used, for example, to populate certain fields in a communication so the user 102 need not enter repeated information, such as for example, the date and time, the subject matter, and/or canned responses.

Figure 5:
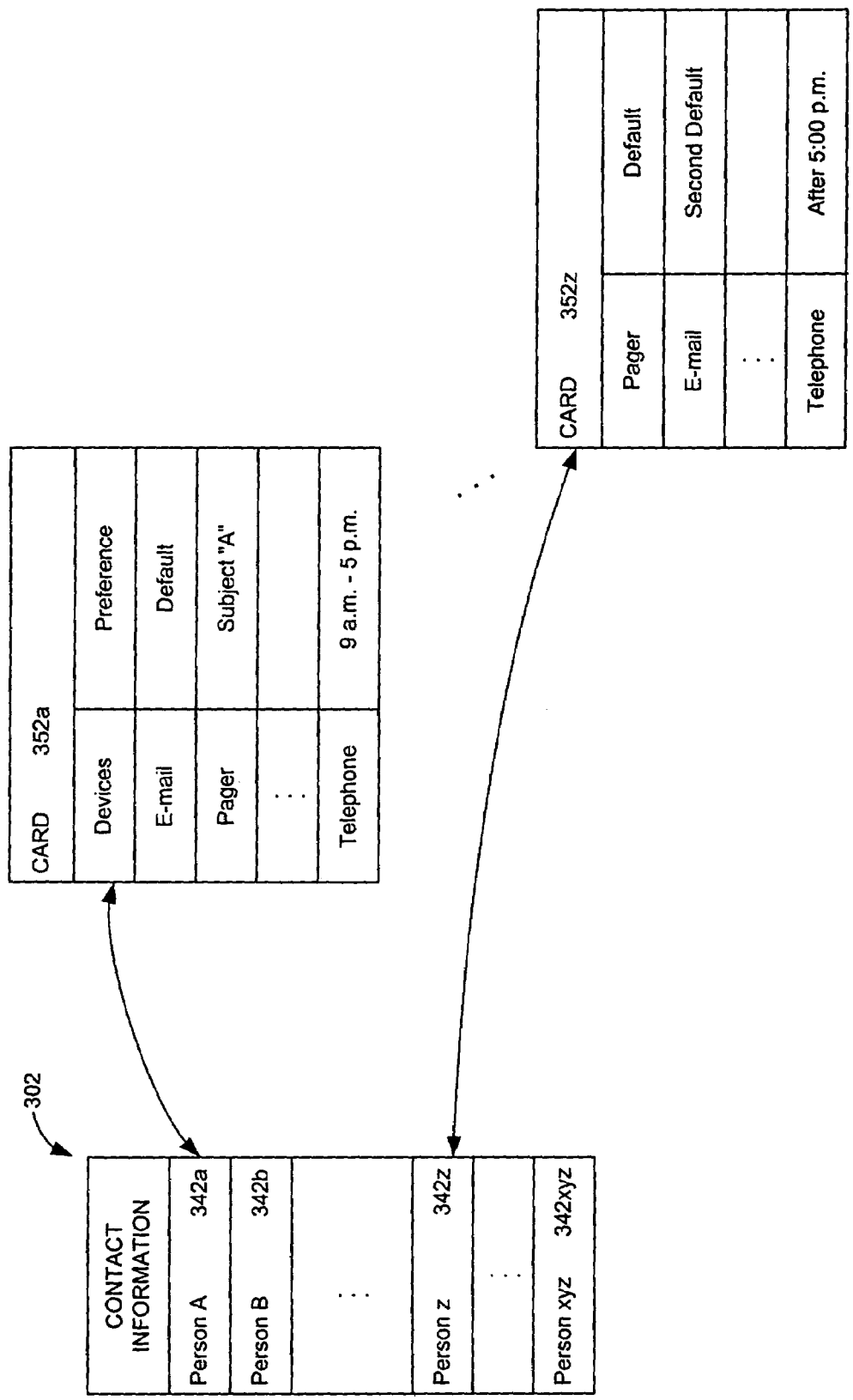
FIG. 5 includes tables illustrating contact information as may be used with the present inventions.

Contact Information—FIG. 5

Referring to FIG. 5, the CIR manager 106 also has contact information 302 for the user 102. Exemplary contact information 302 lists communication partners of the user 102, collectively designated as 342. In addition, typically, each communication partner listed on the contact information 302 is associated with additional information that may be presented to the user on a "contact card", collectively designated as 352. A contact card 352 may contain, among other things, the types of communication devices used by the communication partner corresponding to the contact card. The contact card 352 may also include the preferred methods of communicating for the corresponding communication partner. As with the profile information 202, the preference information in the contact card 352 can be time, subject matter, and other factor sensitive. In sum, the CIR manager 106 may include profile information for the user 102 as well as for each communication partner listed on the contact information 302.

In a preferred embodiment, the CIR manager 106 can either automatically update the contact information or otherwise facilitate the user 102's entry of information regarding his or her communication partner(s). As an example, the CIR manager 106 may receive information about a communication to the user from Person A. The CIR manager 106 may be set so the CIR manager 106 checks the user's contact information to determine whether information on Person A is present in the contact information. If there is no information on Person A, the CIR manager 106 may add Person A's information to the contact information, if that is the preference set up (typically at service set-up) by the user. Alternatively, the CIR manager 106 may query the user as to whether Person A's information should be added.

If the contact information includes Person A's information, the CIR manager 106 may be set-up based on preferences of the user to compare the information received with Person A's communication to Person A's information in the contact information. If the comparison yields differences, the CIR manager 106 may automatically update Person A's contact information or may query the user whether to update Person A's contact information. To further this example, the CIR manager 106 may automatically enter new information regarding Person A, if he or she communicates with the user 102 via a previously unused communication device. As another example, if a new contact, Person ZZ communicates with the user 102, the CIR manager 106 may query the user 102 to determine if the user wishes to enter the information regarding Person ZZ in the contact information 302.

Advantageously, the CIR manager 106 may enter information into a user's contact information 302 when a person or entity not included in the user's contact information makes or receives a communication to or from the user. The CIR manager 106 may automatically enter the new information or first query the user with respect to the entry of the information, per the preferences of the user. For example, assume a person sends the user an e-mail. The CIR manager 106 creates an entry for the e-mail in the message log. If the user has indicated a preference for automatic update of contact information on new communicating partners, then the CIR manager 106 may use the information received in association with the e-mail to create an entry in the contact information for the new communicating partner. The CIR manager 106 may be unable to fill in all of the information in the contact information regarding the new communicating partner. The CIR manager 106 may query the user for the missing information, or the CIR manager 106 may contact the new communicating partner for the missing information. In this example, the new communicating partner communicated by e-mail. The CIR manager 106 may send a reply e-mail requesting the missing information.

Figure 6:
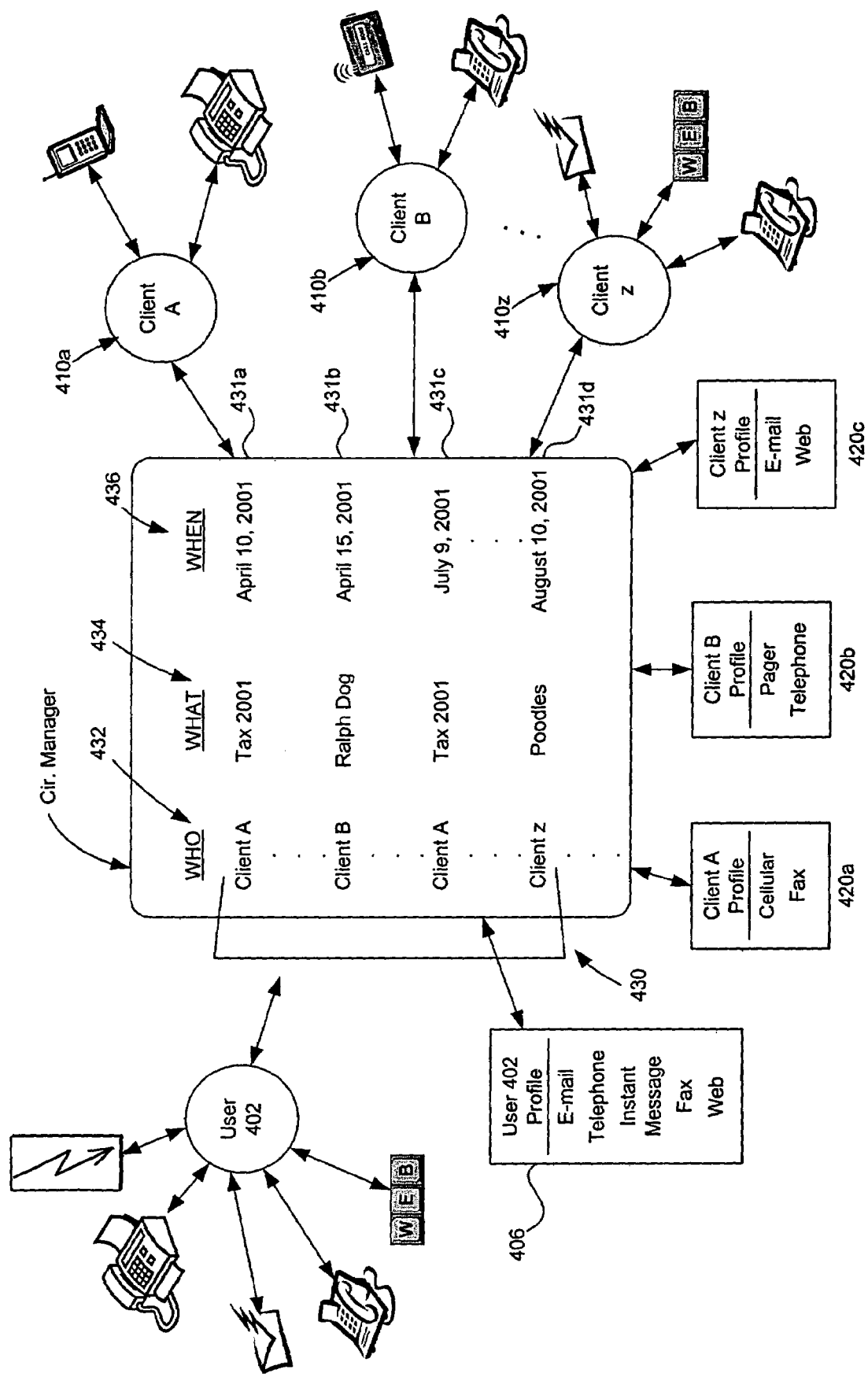
FIG. 6 illustrates a communications environment as may be used with the present inventions

Exchange of Communications—FIG. 6

Referring to FIG. 6, an exemplary method of organizing communications received and sent by the user 402 is described. The CIR manager 404 provides an interface for the user's communications regardless of whether the messages are sent or received by the user 402 and regardless of the type of the communications device. The CIR manager 404 generally provides the interface for the user's communications by reference information on the applications, programs, databases, sources, networks, and other resources that are involved with the user's communications. This information may be registered with the CIR manager 404. Generally, at system set-up, the CIR manager is populated with the appropriate instructions on where to look for information and how to get the information. For example, at system set-up, the CIR manager is provided with the appropriate instructions so the CIR manager may communicate with the telecom manager in the telecommunications network and with the gateway in the data network. The instructions provided to the CIR manager may be updated or changed as needed so as to accommodate a user's changing communication needs.

Also at system set-up, the CIR manager may be provided information and instructions relating to the retrieval of correlated information. As noted above, a user's profile information 406 may indicate a preference for the retrieval of correlated information under certain conditions. Specific data in an entry relating to a communication may be tagged so as to be used to retrieve the information. The tagged data may include numerical tags that include or reference instructions. The instructions may be included in the CIR manager so the CIR manager may access the instructions to obtain the correlated information. For example, the CIR manager may include instructions on obtaining correlated information on the data in the subject field of an entry in the message log. The instructions may include a direction to the CIR manager to make a check of the CIR manager's resources, to query the gateway in the data network, to poll a particular application from a networked computer, or to take other action. The CIR manager carries out the instructions so as to retrieve the correlated information. The CIR manager may be updated or changed as needed so as to accommodate a user's changing communication needs.

The CIR manager 404 has profile information 406 for the user 402, and has contact information (client profile) collectively designated as 420, for each of the user's clients or communicating partners, who are collectively designated as 410. For example, the client profile 420*a* lists a cellular telephone and a facsimile machine for Client A 410*a*. As another example, the profile information 420*b* lists a pager and a telephone for Client B 410*b*.

A exemplary embodiment of the CIR manager 404 tags, associates, categorizes and identifies each message communicated to and from the user 402 per the preferences of the user or some default. For example, the CIR manager 404 creates and/or facilitates the creation of an entry for a communication in message log 430. The message log 420 includes entries, collectively identified as 431. Each entry includes data that identifies a communication of the user 402 using fields (also referred to as identifiers or features). An entry 431 in message log 430 illustrates three fields of the data: (a) who element 432; (b) what element 434; and (c) when element 436. The user may set-up the CIR manager 404 to include additional, fewer, or other identifiers in an entry. Using any identifiers, a message can be retrieved or reviewed by the user 402. Typically, the data in the chosen identifier is tagged so the CIR manager 106 is provided with information or may obtain instructions on how and from where to retrieve the substance of the message. The identifiers in an entry relating to a communication in the message log also may be used to retrieve other information related to the communication.

In particular, the fields of an entry in the message log may be used to obtain information correlating to the communication. The term "correlated information" also may include "corresponding information" or "additional information". Further details on obtaining the correlated or corresponding information are found in the previously referenced and related U.S. patent application Ser. No. 10/112,462, entitled "Methods and Systems for Providing Information Correlated to a Communication", filed concurrently with this application, and which is incorporated herein by reference.

In sum, the CIR manager 404 uses data from an entry (such as data in a field, identifier, or feature) to retrieve information correlated to the communication. In some embodiments, the data may be tagged such as with a numerical tag so as to provide the CIR manager 404 with instructions or information on the retrieval of the corresponding or correlated information. To retrieve the correlated or corresponding information, the CIR manager 10 may check its own resources, and/or may check resources that may be reached through the gateway and the Internet, or through the telecom manager 40 and the PSTN 38, and/or in other ways.

For example, when the user 402 receives, transmits, or exchanges instant messages with Client C, the CIR manager 404 creates an entry for each of the instant messages. The entries are included in the message log 430. The CIR manager 404 may create an entry for an instant message automatically, if that is the user's preference, or may ask the user whether an entry should be created. In addition, the CIR manager 404 may ask the user 402 to enter one or more fields of information.

Assume for example, the user receives an instant message. The instant message is sent to the user over the Internet through the gateway and to the CIR manager 404 prior to appearing on the user's computer screen. The CIR manager 404 receives or otherwise accesses information associated with and/or including the instant message. The CIR manager 404 uses the information to create an entry in the message log.

In this example, the CIR manager 404 accesses information on the originator of the instant message and places the originator information in the who field 432 (also referred to as identifier or feature of the data). For the what field 434 of the entry, the CIR manager 404 may simply include "instant message" or the CIR manager select information associated with the instant message and include that information in the what field 434. With respect to the when field 436, the CIR manager 404 may obtain that information from the instant message, or the CIR manager 404 may use its own internal clock to include a time in the when field 436 of the entry corresponding to the instant message in the message log. The CIR manager 404 may query the user for information to be added, or changed with respect to any entry the CIR manager creates. Depending on the preferences of the user, the CIR manager may tag the data (or part(s) of data) in the fields of the entry so as to be able to retrieve the substance of the communication and/or information correlated to the communication.

The processes for creating entries in a message log for participation in a chat room, and for attempted calls (to or from the user) (wireless or wireline) are generally the same as described in the previous paragraphs for creating the entry for the instant message. The processes for creating entries in a message log for attempted calls (to or from the user) (wireless or wireline) are also generally the same as described in the previous paragraphs for creating the entry for the instant message except that the CIR manager 404 may receive information or access information about the attempted calls from the telecom manager, which may receive the information from the PSTN or other telecommunications network. In some cases, the CIR manager 404 may receive or access information about the attempted calls from the gateway, which may receive the information from the Internet or other data network. Depending on the preferences of the user, the CIR manager may tag the data (or part(s) of data) in the fields of the entry so as to be able to retrieve the substance of the communication and/or information correlated to the communication.

As another example, when the user 402 holds a telephone conversation with Client Z, the CIR manager 404 creates an entry in the message log for the telephone conversation. The CIR manager 404 may query the user for information to include as data in the pertinent entry in the message log. The CIR manager 404 may offer a menu with a list of options, a notepad or other device so the user 402 may enter information for the entry. For example, the user may want to note issues discussed in the telephone conversation. However, as those skilled in the art will appreciate, the entry of information relating to a telephone conversation can also be automatic using, for example, digital signal processing techniques for audio signals. Depending on the preferences of the user, the CIR manager may tag the data (or part(s) of data) in the fields of the entry so as to be able to retrieve the substance of the communication and/or information correlated to the communication.

In sum, the CIR manager 404 can build data relationships for communications of the user 402 regardless of the user's communication methods. The data relationships can include, among other things: (a) relevant parties to a communication; (b) relevant information exchanged between the parties; and (c) relevant documents retrievable from a local storage device or a remote server via a network, such as the Internet.

Figure 7:
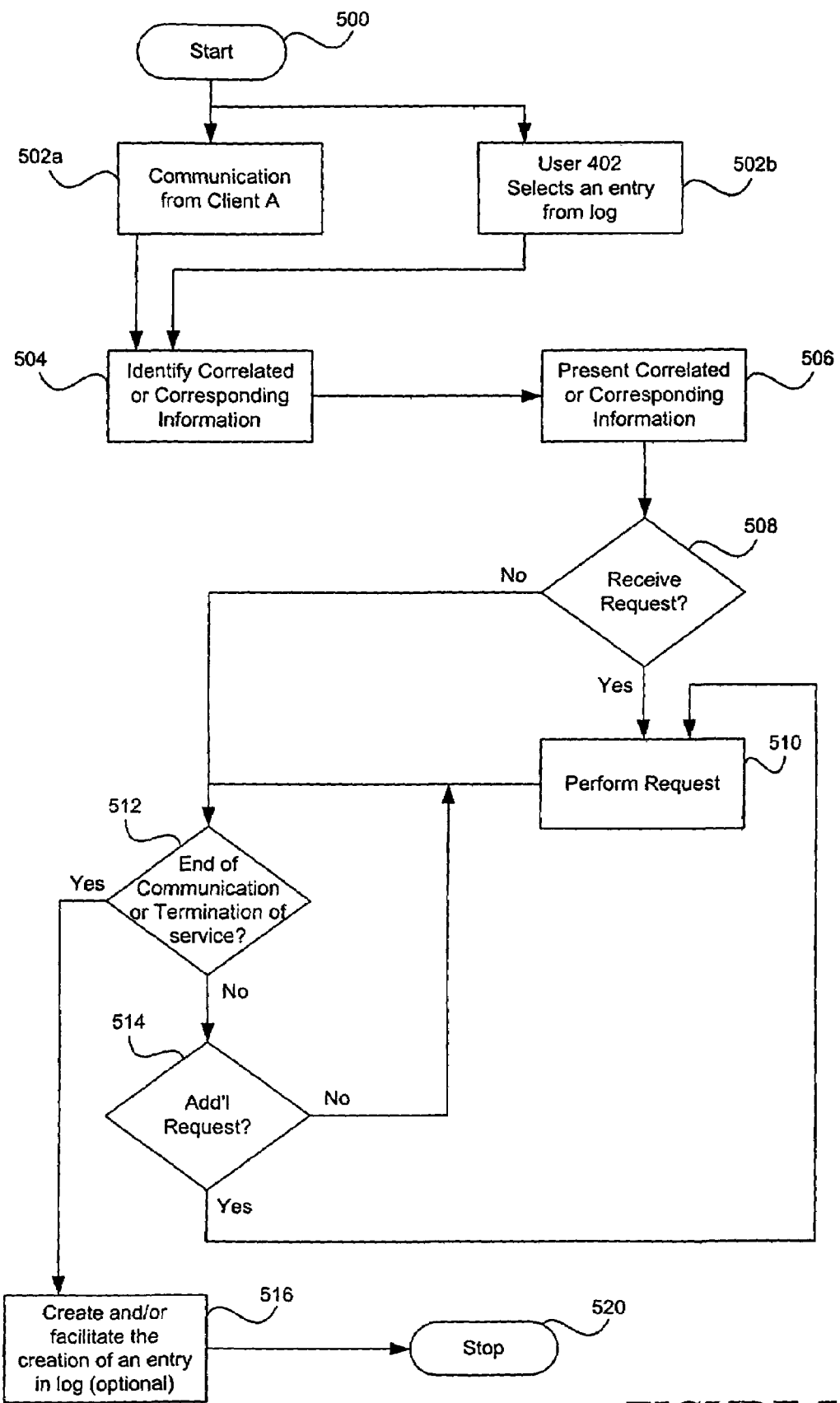
FIG. 7 is exemplary flow diagram of the CIR manager when a user receives a communication message or when a user selects a message log.

Exemplary Flow Diagram—FIG. 7

Referring to FIG. 7, an exemplary flow diagram for the CIR manager 404 is presented for the case in which the user 402 receives a communication from Client A, or selects an entry from a message log where the entry corresponds to a communication. In either action 502*a* or 502*b*, the communication may be a call (wireline or wireless), a fax, a page, a voicemail message, an e-mail message, an instant message, a chat room message, or even an attempt to reach the user by a caller using a wireline or wireless device.

At action 502*a*, the user 402 receives, for example, a communication from Client A. At action 502*b*, the user 402 identifies or selects an entry from the message log. The entry corresponds to a particular message. At action 504, the CIR manager 404 identifies information correlated, respectively depending on the previous action, to the communication from Client A or to the selected entry. The correlated information may include the communication itself, related messages, information and documents, including work-files, web pages, and electronic publications. The CIR manager 404 may identify and/or obtain the correlated information from its own resources, from the gateway in a data network, from the telecom manager in a telecom network, or otherwise.

In an embodiment, instead of automatically identifying the correlated information, the CIR manager 404 may check whether the user desires to be presented with the correlated information. The CIR manager 404 may query the user with presentation options. Alternatively, the user's preference may be included in the user's profile information accessible by the CIR manager 404. The CIR manager 404 may check for a preference such as a preference for the presentation of the information correlated to the communication. The CIR manager 404 then may act according to the preference.

For example, in response to action 502*a* of receiving a communication from Client A, the CIR manager 404 may obtain the "identity" of the communicating party. The identity may be obtained from or using information associated with the communication such as information related to the originating or sending party. The CIR manager 404 may use the identity to identify and obtain related messages and documents. The CIR manager 404 also may use the identity to identify and obtain previous communications relating to Client A. The previous communications may include communications from, to, related to, or mentioning Client A.

Another example is presented with respect to action 502*b* when the user selects an entry from a message log. The entry corresponds to a particular communication. In response to the selection of the entry, the CIR manager 404 may automatically identify messages and documents correlated to the communication corresponding to the entry selected by the user.

At action 506, the CIR manager 404 presents the correlated information to the user 402, using for example, icons and/or displays for the messages and documents. At action 508, the user 402 may request to view messages and/or documents presented at action 506 by, for example, selecting the appropriate icon(s). At action 510, the CIR manager 404 performs the user's request received at action 508 by, for example, launching a browser to display a web page, retrieving a document, or transmitting a document. At action 508, the user 402 may also request a search for a particular document or additional information that has not been presented to the user at action 506. In such a case, the CIR manager 404 searches for messages and/or documents related to the search request and presents the additional information to the user 402 at action 510.

For example, referring to FIG. 6, if Client A calls the user on Nov. 6, 2001 to discuss his/her 2001 tax return, the CIR manager 404 can present to the user 402 all previous communications between the user 402 and Client A, documents identified by the CIR manager 404 as being related to Client A and the subject matter of previous communications, and any additional information the user 402 may request.

Similarly, if Client Z calls the user on Nov. 6, 2001, the CIR manager 404 can facilitate the user's 402 retrieval of information related to Client Z. In this example, the CIR manager 404 includes information that Client Z has a web site, and thus can launch a web browser to display the web page of Client Z. In addition, the CIR manager 404 learns that the subject matter of Client B's message communicated on Apr. 15, 2001 is related to the subject matter of Client Z's message communicated on Aug. 10, 2001, and thus the CIR manager 404 may present message (or the entry in a message log) for Client B's communication on Apr. 15, 2001.

Referring again to FIG. 7, at action 512 the CIR manager 404 monitors for the end of the communication, or if the use of the services provided in connection with the flow diagram illustrated in FIG. 7 is terminated. If the flow diagram started with action 502a, i.e., with a communication from Client A, the CIR manager 404 monitors for the end of the communication. The CIR manager 404 creates or facilitates the creation of an entry corresponding to the communication from Client A, and includes the entry in a message log in action 516. Of course, the creation of an entry corresponding to the communication from Client A can occur at other points in the process described in connection with FIG. 7. The process ends in action 520.

If the flow diagram started with action 502b, i.e., the user 402's selection of an entry corresponding to a particular communication, the CIR manager 404 monitors for the termination of the use of the services by the user 402. If the communication does not end or if a termination of the use is not detected at action 512, the user 402 may make additional requests, such as a request for a display of an identified document, or an search, which is illustrated as action 514. In such case, the CIR manager 404 performs the user 402's request, as discussed in connection with action 510. After performing the additional request, or if the user 402 does not make an additional request, the CIR manager 404 continues to monitor for the end of the communication or the termination of the use at action 512.

Once the communication or the service is ended, the process may move to action 516 and create an entry in a message log with the entry relating to the activities of the user described above. In some embodiments, no log entry is created when the user initiates the described process such as through the selection of an entry from the message log, i.e., action 502a. The flow diagram ends at action 520.

Figure 8:
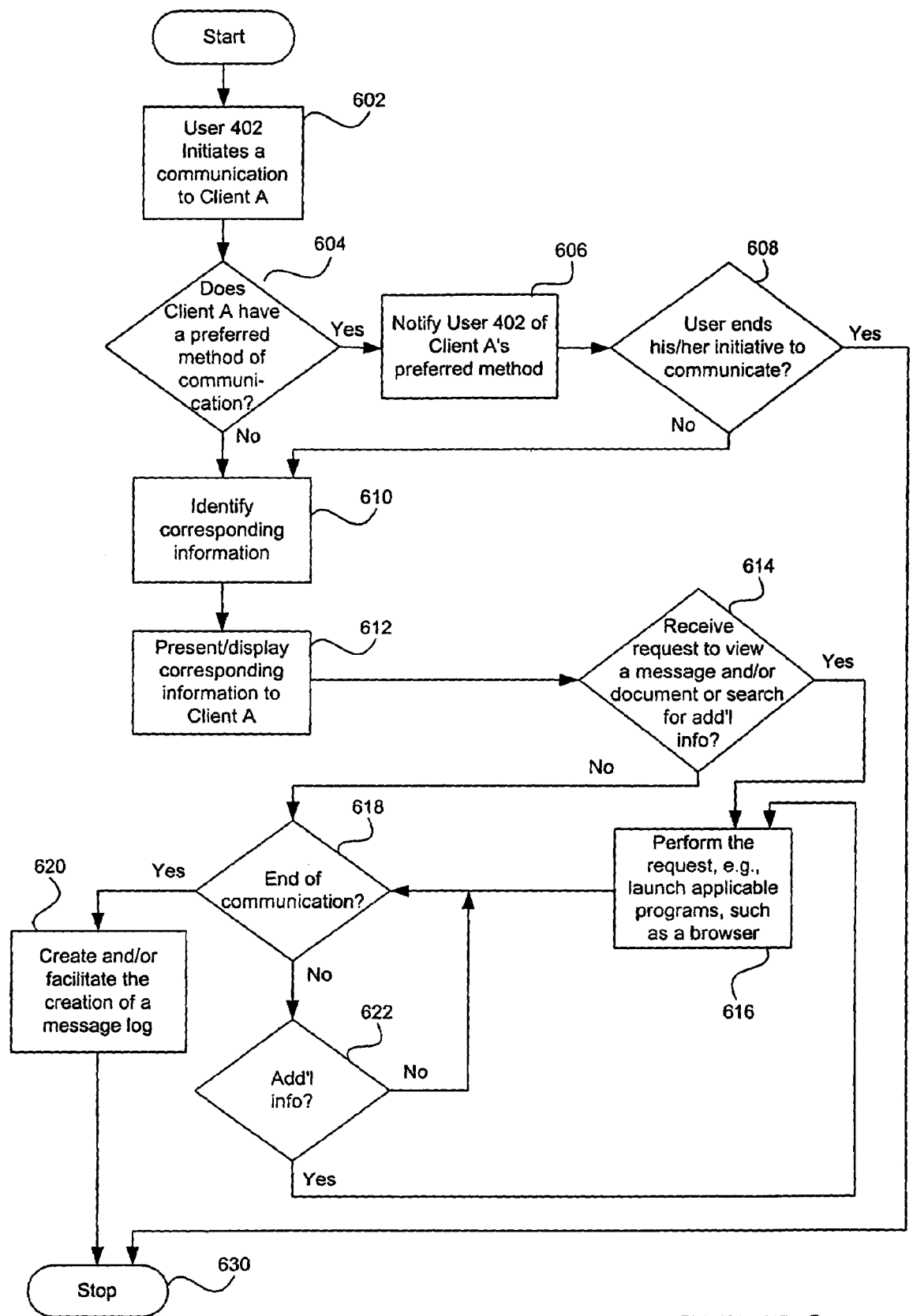
FIG. 8 is an exemplary flow diagram of the CIR manager when a user sends a communication message to his or her communication partner.

Exemplary Flow Diagram—FIG. 8

Referring to FIG. 8, an exemplary flow diagram of the actions that may be taken by exemplary embodiments in the case of a user initiating a communication with Client A. At action 602, the user 402 indicates an initiation of a communication to Client A. At action 604, the CIR manager 404 determines whether Client A has a preferred method of communication. This determination can be made by checking Client A's profile information. If Client A has a preferred method, which can depend on a number of factors, such as the time of the day, the CIR manger 404 notifies or reminds the user 402 of the preferred method of communication at action 606. In response to the CIR manager 404's notification of Client A's preferred method of communication, the user 402 may stop or continue his or her communication initiative as illustrated by action 608. If the user decides to end his or her initiative to communicate with Client A, then the method ends in stop action 630. If the user decides to continue the initiative, the user may use Client A's preferred method as indicated by the CIR manager, or the user may use another method of communication. The method continues to action 610.

At actions 610 and 612, the CIR manager 404 identifies and presents information corresponding to the communication initiated by the user. The information corresponding to the communication initiated by the user may include previous communications between the user 402 and Client A, and other or related messages, documents, or other information including work-files, web pages, and electronic publications. The CIR manager 404 may identify and/or obtain the corresponding information from its own resources, from the gateway in a data network, from the telecom manager in a telecom network, or otherwise.

In an embodiment, prior to identifying the corresponding information, the CIR manager 404 may check whether the user desires to be presented with the corresponding information. The CIR manager 404 may query the user with options. Alternatively, the user's preference may be included in the user's profile information accessible by the CIR manager 404. The CIR manager 404 may check for a preference such as a request for the display of the information corresponding to the initiated communication. The CIR manager 404 then may act according to the preference.

Advantageously, the present inventions allow the user to request information in addition to that corresponding information which has been presented to the user as explained in the previous paragraph. Alternatively, the information corresponding to the initiated communication may be categorized and the categories of corresponding information may be presented to the user. The user then may select from among the categories and obtain additional information. At action 614, the CIR manager 404 determines whether the user 402 has made a request for additional information. If the user has made a request, then at action 616, the CIR manager 404 performs the task requested by the user 402. If the CIR manager 404 has not received a request for additional information, or after performing the task requested by the user in action 616, the CIR manager monitors for end of the initiation of the communication by the user in action 618. An end to the initiation of a communication may include sending or otherwise indicating that the communication be delivered, abandonment of the initiative, time-out, or other action.

If the end of the initiation of the communication does not occur (within a specified time or otherwise), the CIR manager 404 monitors for a request from the user 402 at action 622 and performs the requested task at action 616. After performing the request or if the user does not make an additional request at action 622, the CIR manager 404 continues to monitor for the end of the initiation of the communication in action 618. If an end of the initiation of the communication occurs, the CIR manager 404 may create and/or facilitate in action 620 an entry in the message log. The entry corresponds to the communication initiated by the user. The flow diagram ends at action 630.

Figure 9:
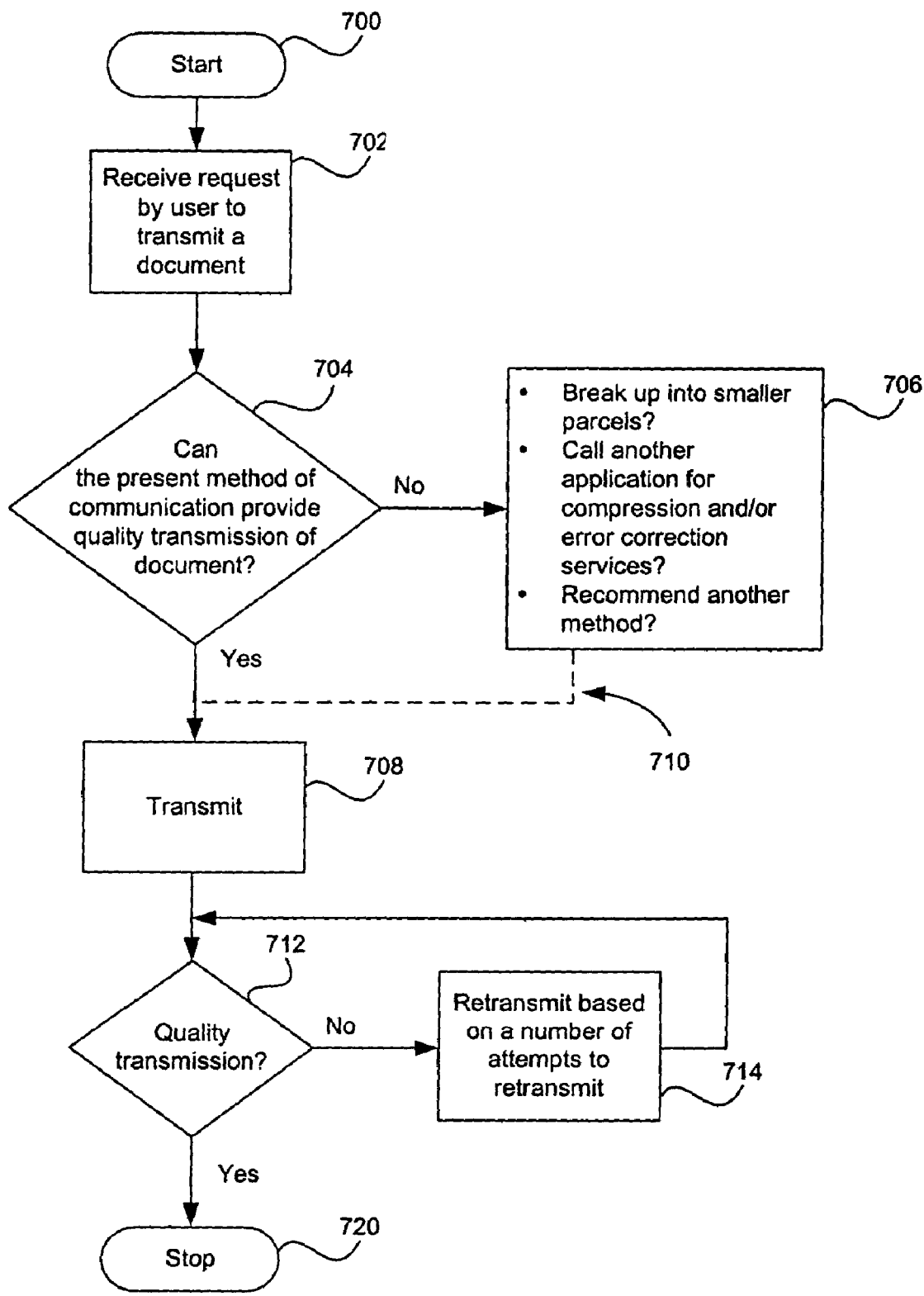
FIG. 9 is an exemplary flow diagram for performing a task requested by user in FIG. 5 or FIG. 6, such as a request for document transmission.

Exemplary Flow Diagram—FIG. 9

Referring to FIG. 9, an exemplary flow diagram for a task that can be requested by the user 402 such as action 510 in FIG. 7 or action 616 in FIG. 8. Such a task may include the request for transmission of a document to a communication partner. At action 702, a request for a document transmission is detected. At action 704, the CIR manager 404 determines whether the requested document transmission can be facilitated in the communication mode chosen by the user 402 by, for example, comparing the size of the input buffer of a targeted communication device and the size of the document the user 402 wishes to send to the communication partner. If the answer to the determination is no, the CIR manger 404 determines other possibilities for transmitting the document at action 706. Examples of other possibilities include: (a) breaking the document into smaller parcels; (b) calling another application for performing services such as compression and error correction; or (c) recommending another mode of transmission, among others. Depending on the best possibilities that the CIR manager 404 determines independently and/or based on the user 402's input, a transition may be made from action 706 to action 708. The dotted line 710 represents that the transition is not always made, for example, if the user selects to end the request to transmit the document.

At action 708, the requested document is transmitted. At action 712, the CIR manager 404 determines if quality transmission of the document has occurred. If the answer to this determination is no, the CIR manager 404 retransmits the document at action 714. The retransmission of the document may also depend on the number of attempts made to transmit the same document. For example, if the number of attempts is greater than a default value, the CIR manager 404 may not retransmit the document.

The example illustrated with FIG. 9 concerns the user 402's request to transmit a document. However, the user may request other tasks, and if the user requests a task that can be better served by another application, the CIR manager 404 can call that application, whether the application resides on the local server or on a remote server.

The exemplary embodiments of the inventions described herein were chosen and described in order to explain the principles of the inventions and their practical applications so as to enable others skilled in the art to utilize the inventions including various embodiments and various modifications as are suited to the particular uses contemplated. The examples provided herein in the written description or in the drawings are not intended as limitations of the inventions. Other embodiments will suggest themselves to those skilled in the art. Therefore, the scope of the inventions is to be limited only by the claims below.

What is claimed is:

1. A computing system for creating a call message log, the system comprising:
   a processor communicating with memory;
   the processor monitoring for an end of a communication and storing an entry in the call message log for the communication;
   the processor receiving a selection of a field within the entry and receiving a request for information correlated to the selected field;
   the processor determining there are different categories of information correlated to the selected field and presenting the different categories of information that are correlated to the selected field;
   the processor receiving another selection that selects a category from the different categories of information;
   the processor obtaining categorical information correlated to the selected field;
   the processor querying for a preference for presentation of the information correlated to the selected field;
   the processor querying for a device preference for presentation of additional information correlated to a device that originated the communication;
   the processor tagging data in the entry with a path route to retrieve a substance of the communication; and
   when the communication is an unanswered call, then the processor substituting "unanswered call" in a subject field of the entry that corresponds to the communication.

2. A system according to claim 1, further comprising:
   when a reply communication is received from a communicating partner, means for comparing the communicating partner's name and address to a directory storing communicating partners;
   when the communicating partner's name and address is not included in the directory, then means for adding the communicating partner's name and address to the directory;
   means for comparing the communicating partner's name and address to entries in the call message log;
   when the communicating partner's name and address is found in the call message log, then means for retrieving an entry corresponding to the communicating partner's name and address;
   means for comparing the communicating partner's name and address to scheduled activities in an electronic calendar;
   when the communicating partner's name and address is found in the electronic calendar, then means for retrieving a scheduled activity associated with the communicating partner's name and address; and
   means for presenting the reply communication, the entry from the call message log, and the scheduled activity to the user.

3. A system according to claim 1, further comprising:
   means for correlating an area code in the subject field of the entry to a website link associated with the area code; and
   means for querying a user for information to include in the entry associated with the communication.

4. A system according to claim 1, further comprising means for accessing a profile storing a preference for correlated information based on an originating device.

5. A system according to claim 1, further comprising means for storing a profile for each communicating partner describing communications devices used by each communicating partner.

6. A method for creating a call message log for communications, comprising:
   monitoring for an end of a communication;
   storing an entry in the call message log for a communication;
   receiving a selection of a field within the entry;
   receiving a request for information correlated to the selected field;
   determining there are different categories of information correlated to the selected field;
   presenting the different categories of information that are correlated to the selected field;
   receiving another selection that selects a category from the different categories of information;
   obtaining categorical information correlated to the selected field;
   querying for a preference for presentation of the information correlated to the selected field;
   querying for a device preference for presentation of additional information correlated to a device that originated the communication;
   tagging data in the entry with a path route to retrieve a substance of the communication; and
   when the communication is an unanswered call, then substituting "unanswered call" in a subject field of the entry that corresponds to the communication.

7. A method according to claim 6, further comprising:
when a reply communication is received from a communicating partner, comparing the communicating partner's name and address to a directory storing communicating partners;
when the communicating partner's name and address is not included in the directory, then adding the communicating partner's name and address to the directory;
comparing the communicating partner's name and address to entries in the call message log;
when the communicating partner's name and address is found in the call message log, then retrieving an entry corresponding to the communicating partner's name and address;
comparing the communicating partner's name and address to scheduled activities in an electronic calendar;
when the communicating partner's name and address is found in the electronic calendar, then retrieving a scheduled activity associated with the communicating partner's name and address; and
presenting the reply communication, the entry from the call message log, and the scheduled activity to the user.

8. A method according to claim 6, further comprising:
tagging an originating number associated with the communication and retrieving information correlated to the originating number.

9. A method according to claim 6, further comprising accessing a profile storing a preference for correlated information based on an originating device.

10. A method according to claim 6, further comprising storing a profile for each communicating partner describing communications devices used by each communicating partner.

11. A computer program product comprising a computer readable storage medium storing computer readable instructions for performing a method, the method comprising:
monitoring for an end of a communication;
storing an entry in a call message log for a communication;
receiving a selection of a field within the entry;
receiving a request for information correlated to the selected field;
determining there are different categories of information correlated to the selected field;
presenting the different categories of information that are correlated to the selected field;
receiving another selection that selects a category from the different categories of information;
obtaining categorical information correlated to the selected field;
querying for a preference for presentation of the information correlated to the selected field;
querying for a device preference for presentation of additional information correlated to a device that originated the communication;
tagging data in the entry with a path route to retrieve a substance of the communication; and
when the communication is an unanswered call, then substituting "unanswered call" in a subject field of the entry that corresponds to the communication.

12. A computer program product according to claim 11, further comprising computer-readable instructions for:
when a reply communication is received from a communicating partner, comparing the communicating partner's name and address to a directory storing communicating partners;
when the communicating partner's name and address is not included in the directory, then adding the communicating partner's name and address to the directory;
comparing the communicating partner's name and address to entries in the call message log;
when the communicating partner's name and address is found in the call message log, then retrieving an entry corresponding to the communicating partner's name and address;
comparing the communicating partner's name and address to scheduled activities in an electronic calendar;
when the communicating partner's name and address is found in the electronic calendar, then retrieving a scheduled activity associated with the communicating partner's name and address; and
presenting the reply communication, the entry from the call message log, and the scheduled activity to the user.

* * * * *